June 27, 1933. W. C. HEDGCOCK 1,916,148
TRUCK
Filed Oct. 2, 1931 3 Sheets-Sheet 2
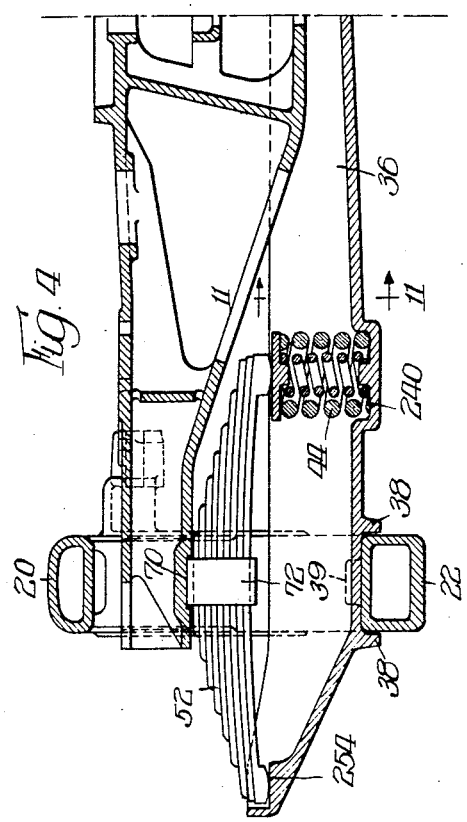
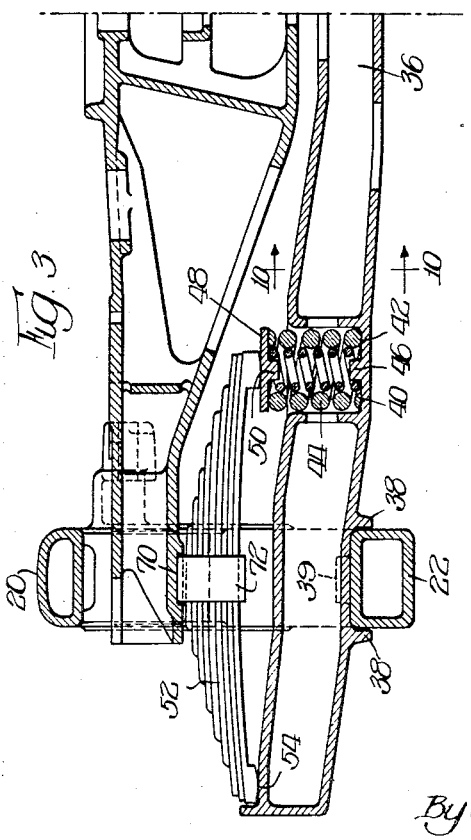
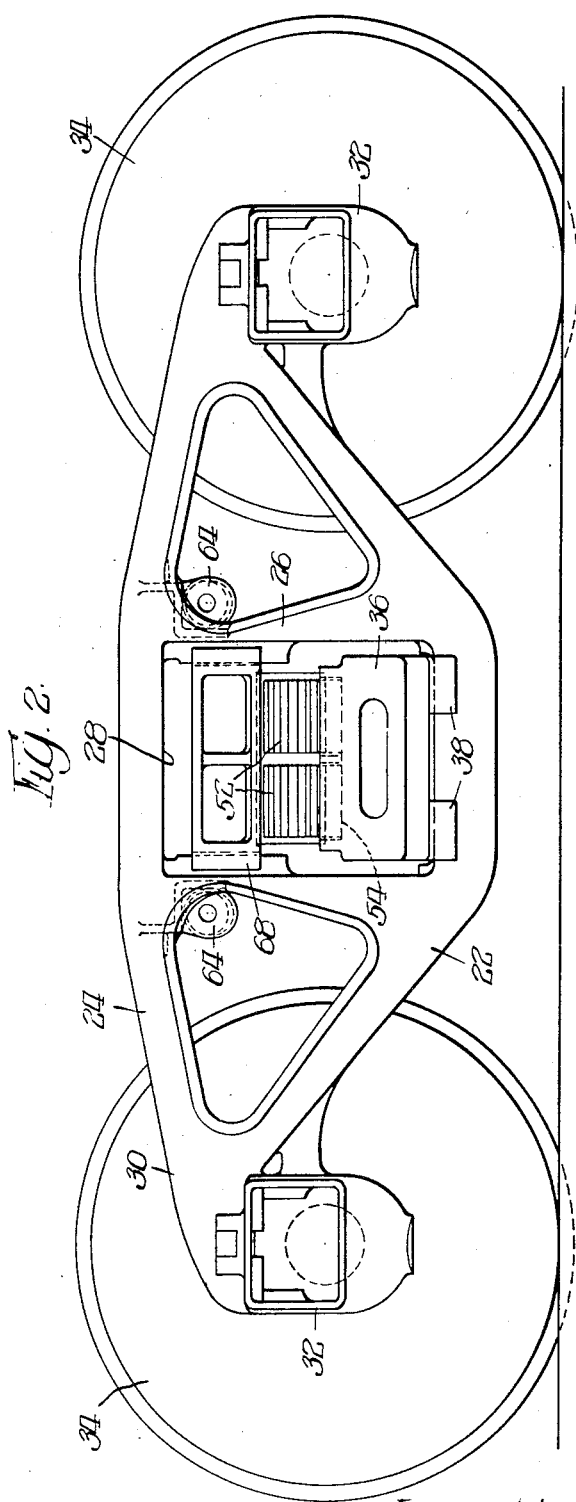
Inventor:
William C. Hedgcock,
By Wilkinson, Huxley, Byron & Knight
Attys.

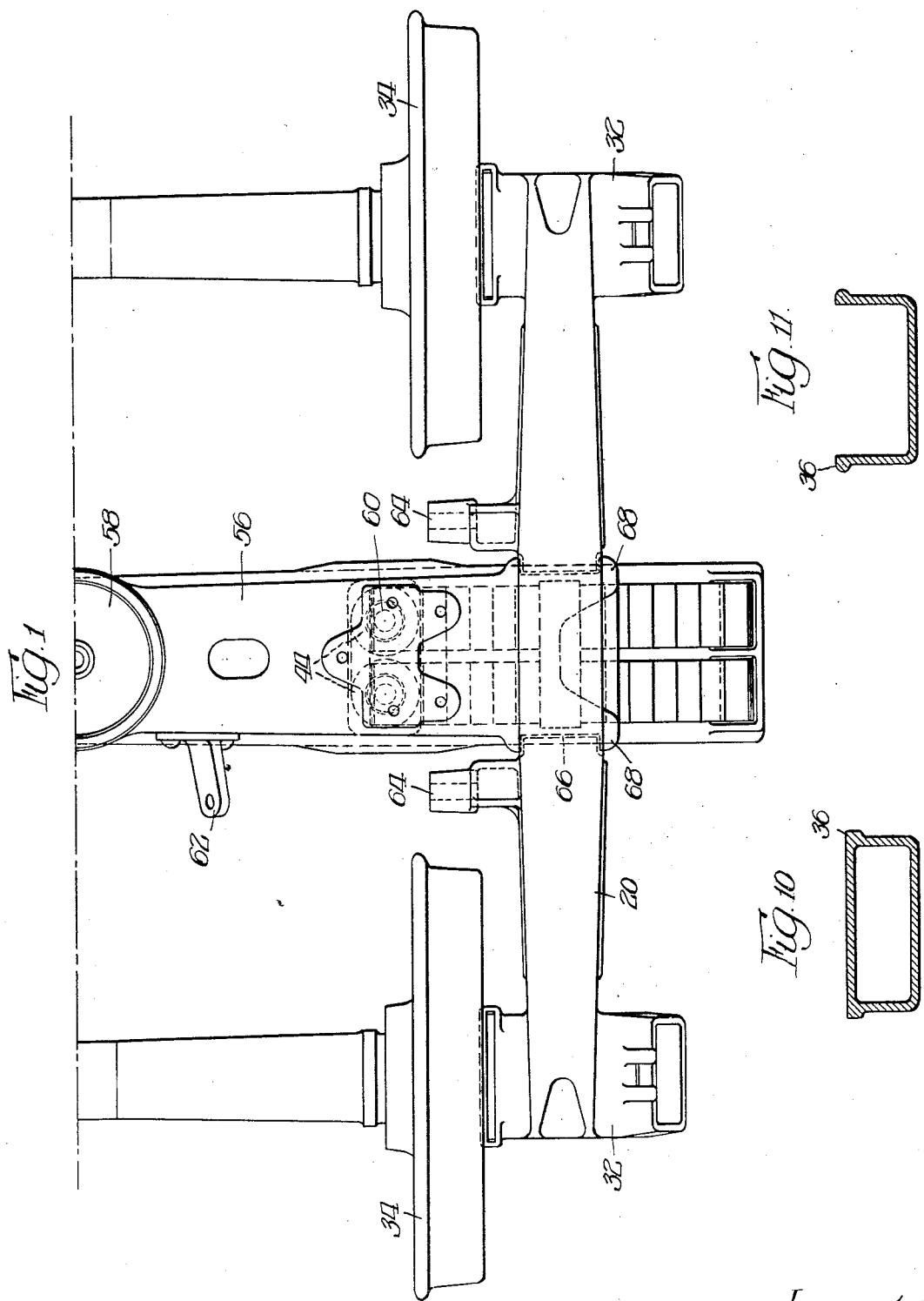

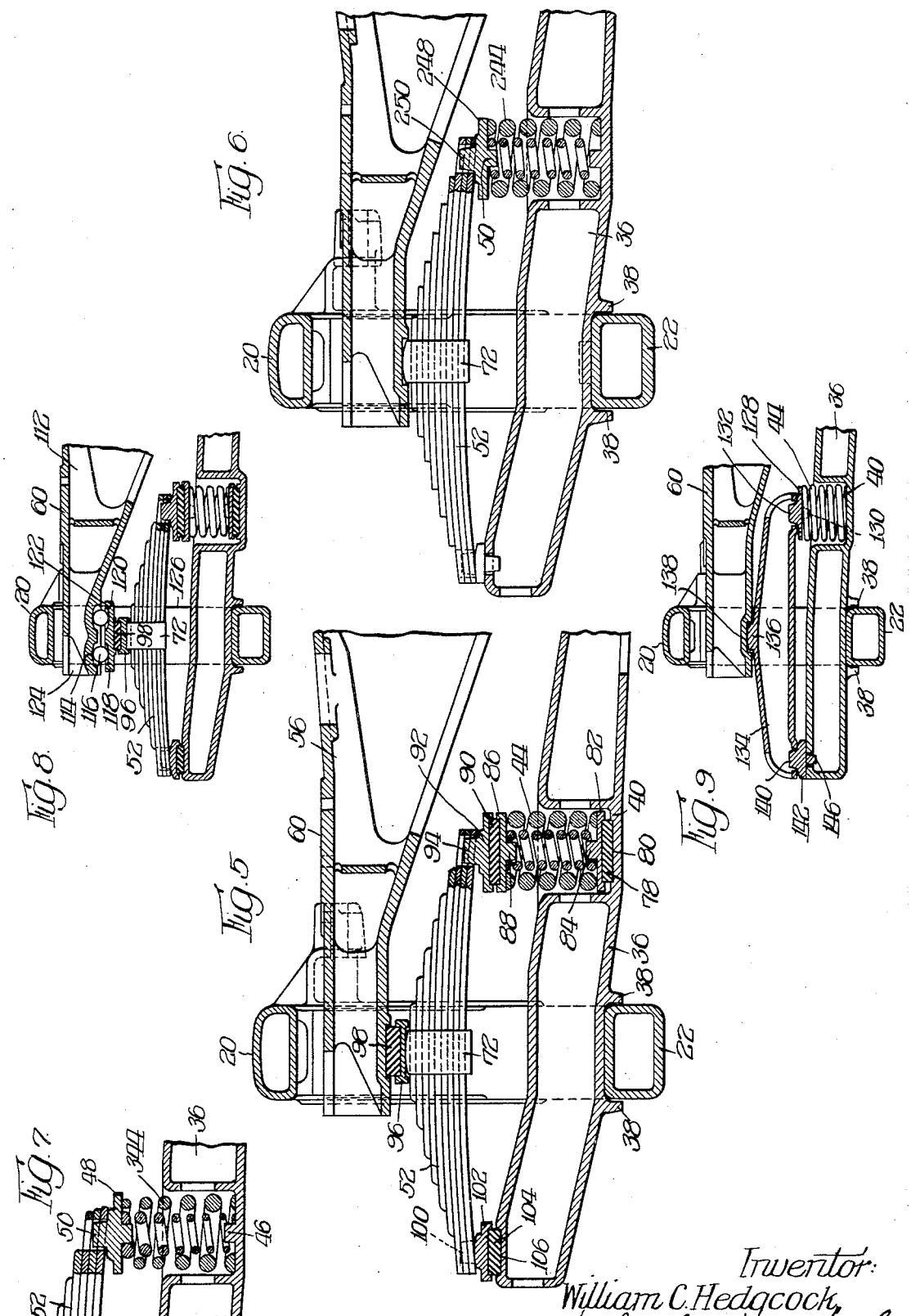

Patented June 27, 1933

1,916,148

UNITED STATES PATENT OFFICE

WILLIAM C. HEDGCOCK, OF WILMETTE, ILLINOIS, ASSIGNOR TO AMERICAN STEEL FOUNDRIES, OF CHICAGO, ILLINOIS, A CORPORATION OF NEW JERSEY

TRUCK

Application filed October 2, 1931. Serial No. 566,491.

This invention pertains to car trucks.

Desirable features for freight car trucks are economy, simplicity, lightness, strength and ease of maintenance, and these features are generally obtained within practical limitations on freight trucks now in use. However, present freight car trucks are very deficient in easy riding qualities, since the spring suspension usually consists only of coil springs which strike a natural period of oscillation or vibration at some operating speed of the car; the resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity.

It is possible and desirable to provide a freight car truck superior to the truck embodying only coil springs, and this may be accomplished by providing a truck wherein leaf springs are used alone. However, with the dimensions available for the usual freight car truck or similar truck, space is limited. It has been customary where leaf springs are used on freight car type trucks to use full elliptic springs mounted on the side frame within the bolster openings and supporting the bolster. The load to be carried by trucks from modern freight cars or locomotive tenders or similar equipment is quite heavy, requiring a high capacity elliptic spring if used. To obtain this high capacity with a full elliptic spring requires a great deal of space, more space than is commonly available within the bolster openings of the usual freight car type of truck. This space is limited because the height from the rail to the top of the side frame is restricted by the clearance required for the car body frame. The distance from the rail to the underside of the side frame must be maintained with a certain minimum clearance prescribed by operating conditions, the dimensions of the structural members of the side frame and truck bolster being determined by the strength required in these parts, the whole developing conditions wherein the space for the springs is limited and wherein full elliptic springs of suitable capacity cannot generally be used.

It is, therefore, an object of this invention to provide a freight car truck wherein semi-elliptic springs are used, these semi-elliptic springs providing the same capacity as full elliptic springs but requiring substantially but half the vertical height required for full elliptic springs, consequently providing a structure which may be used within the usual space limitations.

Another object of the invention is to provide a car truck which provides good riding qualities and at the same time is economical to make and maintain, is simple and light in construction and fulfills all requirements of manufacture and service.

Still another object of the invention is to provide a truck construction wherein resilient pads are provided for dampening out metallic vibration transmitted through metallic truck parts, and also for the purpose of deadening noise.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a fragmentary top plan view of a truck construction embodying the invention;

Figure 2 is a side elevation of the truck construction shown in Figure 1;

Figures 3 to 9 inclusive are modified forms showing transverse fragmentary sectional elevations taken substantially on the transverse center line of the truck construction shown in Figure 1;

Figures 10 and 11 are sectional elevations taken substantially in the planes as indicated by the lines 10—10 and 11—11 of Figures 3 and 4 respectively.

Referring first of all more particularly to the truck construction illustrated in Figures 1 to 6 inclusive, the side frame 20 is preferably of truss construction, including the tension member 22 and compression member 24 integrally connected by spaced column guides 26 forming the window or bolster opening 28 in said side frame. The tension and compression members converge adjacent their ends as at 30 and are provided with the journal boxes 32 shown as of the standard A. R. A. construction, though they may be of any preferable construction. The journal boxes have cooperative relation with the journal ends of the wheel and axle assemblies 34 which also may be of any preferable construction.

The spaced side frames are connected and spaced by the spring plank 36 extending transversely of the truck and into and through the windows 28, the spring plank being provided with the depending flanges 38 embracing the lower arch bar of the tension member, thus holding the side frames in spaced relation laterally and against twisting laterally. The spring plank may also receive the dowel 39 provided on the lower arch bar of the tension member for positioning said plank. The spring plank inwardly of the side frames is provided with the spring pocket 40 having the spring seat 42 on which the coil spring assemblies 44 are carried. The spring assembly shown in Figure 3 is of constant section and constant pitch. The spring assembly 244 shown in Figure 6 is of variable pitch, while the spring assemblies 344 shown in Figure 7 are springs formed from a tapering bar whereby the section areas are varied. It will of course be understood that springs of variable pitch or variable stiffness may be used, such springs being shown in Application Serial No. 552,153, filed July 21, 1931.

The spring pocket is preferably provided with the upwardly extending positioning dowel 46 and a spring cap 48 is mounted on top of the coil spring assemblies 44, the positioning dowel 50 thereon cooperating with the top of said assemblies. The spring cap 48 provides a seat for the inner end of the semi-elliptic spring assemblies 52. The spring cap 48 such as shown in Figure 3 may be replaced by the spring cap 248 such as shown in Figure 6. The spring cap 248 is also provided with the depending positioning dowel 50, and the upwardly extending positioning dowel 250 engaged in a suitable aperture formed in the inner end of the leaf spring assembly 52. The opposite or outer end of the semi-elliptic springs 52 is seated on the spring seat 54 provided on the spring plank outwardly of the side frame.

The bolster 56 is provided with the usual center and side bearings 58 and 60, and brake hanger brackets 62 and 64 are provided on the bolster and side frames having cooperative relation with the brake rigging. The bolster is mounted with each end extending into the bolster opening 28, and is provided with the spaced guiding surfaces 66 and the guide lugs 68 embracing the column guides 26 for sliding cooperation therewith and whereby the bolster is maintained in lateral relation with respect to the side frame. An enlarged opening is provided in the side frame below the guiding faces of the columns for clearance for the guide lugs 68 in assembling the bolster and the side frame. The bolster is provided with the seat 70 on a lower chord thereof, said seat being disposed substantially in the plane of the side frames for cooperative relation with the spring band 72 of the spring assembly 52 whereby the bolster is supported on the spring plank partially directly by the semi-elliptic spring, and partially through the semi-elliptic spring and coil spring assemblies.

In the modification shown in Figure 5 cushioning means is provided between the various parts. As before, the spring plank 36 is provided with a spring pocket 40. In this modification the spring pocket is recessed as at 78 for the reception of the rubber or other resilient pad 80 disposed therein and beneath the spring seat member 82. The coil spring assemblies 44 are seated on the spring seat 82 positioned by means of the dowel 84, and a spring cap 86 is seated on the upper portion of the coil spring assemblies, being positioned thereon by means of the depending dowel 88, the spring cap 86 being recessed for the reception of the resilient or other pad 90 provided between the spring cap and the spring seat member 92, said spring seat member 92 being provided with the upwardly extending positioning dowel 94 received in a suitable aperture provided in the outer end of the leaf spring assemblies 52. The spring band 72 is seated in the member 96 which is recessed for the reception of the resilient or other pad 98 provided between the member 96 and a suitable recess formed in the outer end of the bolster 56. The outer end of the leaf spring assembly is apertured for the reception of the positioning dowel 100 provided on the seat member 102, said seat member being downwardly recessed for the reception of the resilient pad 104 provided between said member and the complementary portion 106 provided on the spring plank 36.

In the construction shown in Figure 8 a lateral motion bolster 112 is provided, said bolster being provided with a suitable center bearing and the side bearing 60, and extending into the bolster opening. The bolster, in this case, instead of seating directly on the spring bands 72 of the leaf spring assembly 52 is provided with the lateral motion tracks 114 for receiving the lateral motion rollers 116 seated on suitable tracks 118 provided in the roller seat member 120, said member being recessed for receiving the resilient pad 98. The resilient pad 98 is received in a suitable recess formed in the member 96, said member being seated on the spring band 72. The roller seat member 120 is guided between the column guides 126 and is provided with the spaced lugs 122 embracing said columns for preventing displacement of the members. The bolster is provided with the lugs 124 which permit a suitable lateral motion of the bolster. The bolster is thereby permitted a certain amount of lateral motion to reduce lateral shocks which might be transmitted between the side frame and the bolster. The extent of the lateral motion is limited by means of the stops or lugs 124. The seating of the inner and outer ends of the leaf spring is substantially the same as already described with respect to Figure 5, the similar parts being similarly numbered. It will of course be appreciated that the lateral motion means may be applied to any of the other modifications with or without the resilient pads, and the resilient pads may also be interposed between the bolster and the lower arch bar if desired.

In the modification illustrated in Figure 9 the spring plank 36 is provided with the coil spring pocket 40 for the reception of the coil spring assemblies 44, the spring cap 128 similar to the spring caps illustrated in Figures 5 and 6 being provided positioned on the upper ends of the coil springs by means of the depending dowel 130. The cap is provided with the upstanding dowel 132 which in this modification is received in a suitable aperture provided in the substantially rigid equalizer member 134. The equalizer member is provided with the arcuate fulcrum portion 136 received in a suitable seat 138 provided on the bolster 60. The outer end of the equalizer member is apertured and receives the upstanding dowel 140 of the seat member 142 positioned on the spring plank by means of the depending dowel 146.

With the type of trucks described herein the spring plank is a load carrying member in the nature of a beam supported at two spaced points and loaded at four spaced points. This necessitates the spring plank being made strong enough to resist the bending action resulting from such a method of loading, and for this purpose the spring plank may be made of any suitable section, such as the box section shown in Figure 10, or may be made of any other section such as the channel section shown in Figure 11. In the event that a channel section is provided, the spring seat 54 is provided on the upper chord such as shown in Figure 3, and the spring plank is depressed for proper clearances between the bolster to obtain the proper depth for the springs. Where the U-shaped section is provided the seat 254 for the outer end of the leaf spring is provided on the lower chord or web of the U-shaped spring plank, and the pocket 240 is also provided in said lower chord, all as illustrated in Figure 4.

In operation of the above identified structures, the coil springs and leaf springs, where such are used, are in series. Each can work independently of the other, and the coil springs are free to respond quickly to sudden shocks, the leaf springs conforming to slower impulses. However, each reacts against the other and effectively serves to ripple out or break up synchronous vibration. This is particularly effective where the two types of springs have different vibration periods. During the action of either spring the leaf spring also acts as an equalizer to compensate for differences in level between its non-resilient end connection and its resilient end connection. The leaf springs do a certain amount of work absorption which also tends to defeat synchronous vibration, and yet does not impair the sensitiveness of the coil springs.

As will be seen, the advantage of the easy riding passenger truck spring suspension is obtained, yet with an economy of spring material since the coil springs carry only half the load and therefore less coil spring material is required. Also, by combined motion of the coil and leaf springs, sufficient travel is obtained for soft motion, and thus semi-elliptic leaf springs are used rather than full-elliptic, which thus requires less leaf spring material.

The advantages of this system are obtained by the novel arrangement of springs, bolster, side frame, spring plank, and associated parts; thereby a minimum amount of spring weight and structural parts and weights are required to properly distribute and transmit the loads. This is largely accomplished with the four point support on the spring plank, having spaced non-resilient connections and spaced resilient connections (through the coil springs) to the leaf springs, operating as a connection for the spring suspension system, and distributing the loads from the spring system to the side frames. A spring plank is a part usually required with existing car trucks, and by improving it with novel features and using it in connection with other novel features, the addition of other heavy structural members is avoided, and the advantages of an easy riding spring suspension is obtained.

Provision is made for adjusting the height of the bolster above the rail to compensate for wheel wear and other causes which might result in undesired variations in car coupler heights above the rail. This provision for adjustment is made in the connection between the spring plank and the side frame. When height adjustment is desired, the spring plank is raised above its seat on the lower arch bar and a shim of the desired thickness is inserted between the spring plank and said lower arch bar. The depending flanges 38 are therefore made of sufficient downward projection so that they may still engage the sides of the lower arch bar when a shim is in place between the two members.

While the drawings referred to herein show the center of the semi-elliptic leaf spring located at the center line of the side frame with the supports for the leaf spring spaced equidistant on each side of the side frame transversely of the truck, it should be understood the leaf spring is not necessarily to be located symmetrical with the center line of the side frame, but that the leaf springs may be placed closer together transversely of the truck or farther apart.

It is to be understood that I do not wish to be limited by the exact embodiment of the device shown which is merely by way of illustration and not limitation, as various and other forms of the device will of course be apparent to those skilled in the art without departing from the spirit of the invention or the scope of the claims.

What is claimed is—

1. In a car truck, the combination of a side frame including tension and compression members and integral connecting column guides forming a window, a spring plank, a bolster extending into said window, a leaf spring supporting said bolster at a point and supported on said spring plank at a plurality of points, one of said points of support being outwardly of the side frame and the other of said points of support being through a metallic spring disposed inwardly of said side frame.

2. In a car truck, the combination of a side frame including tension and compression members and integral connecting column guides forming a window, a spring plank, a bolster extending into said window, a leaf spring supporting said bolster at a point and supported on said spring plank at a plurality of points, one of said points of support being outwardly of the side frame and the other of said points of support being through a coil spring disposed inwardly of said side frame.

3. In a car truck, the combination of a side frame, a spring plank, a coil spring carried by said spring plank inwardly of said side frame, a leaf spring supported at one end by said coil spring and at the other end directly by the spring plank, and a bolster supported by said leaf spring.

4. In a car truck, the combination of a side frame, a transverse member, a leaf spring supported thereon at spaced points, one of said points being inwardly of said side frame, said last named point of support being through a coil spring, and a bolster supported by said leaf spring.

5. In a car truck, the combination of spaced side frames and a spring plank engaged thereby, coil springs disposed inwardly of said side frames and supported by said spring plank, leaf springs supported by said spring plank and by said coil springs, and a bolster supported by said springs.

6. In a car truck, the combination of spaced side frames and a spring plank supported thereby, coil springs disposed inwardly of said side frames and supported by said spring plank, leaf springs supported by said spring plank outwardly of said side frames and by said coil springs, and a bolster supported by said leaf springs.

7. In a car truck, the combination of spaced side frames and a spring plank supported thereby, spaced coil springs disposed inwardly of said side frames and supported by said spring plank, spaced leaf springs supported partly by said coil springs and partly directly by said spring plank, and a bolster supported by said leaf springs.

8. In a car truck, the combination of spaced side frames and a spring plank supported thereby, spaced coil springs disposed inwardly of the side frames and supported by said spring plank, spaced leaf springs supported partly by said coil springs and partly directly by said spring plank outwardly of said side frames, and a bolster supported by said leaf springs.

9. In a car truck, the combination of a side frame and a transverse member, a leaf spring supported on said transverse member at spaced points, one of said points being inwardly of said side frame, said last named point of support being through a coil spring, and a bolster supported by said leaf spring.

10. In a car truck, the combination of a transverse member, a semi-elliptic spring supported thereon at spaced points, the inner of said points including a coil spring, lateral motion roller means supported by said semi-elliptic spring, and a bolster carried by said lateral motion roller means.

11. In a car truck, the combination of a side frame, a spring plank, a bolster, a leaf spring supporting said bolster at a point and supported on said spring plank at a plurality of points, one of said points of support being outwardly of the side frame and the other of said points of support being through a metallic spring disposed inwardly of said side frame.

12. In a car truck, the combination of a side frame, a spring plank, a bolster, a leaf spring supporting said bolster at a point substantially in the plane of said side frame and supported on said spring plank at a plurality of points, one of said points of support being outwardly of the side frame and the other of said points of support being through a metallic spring disposed inwardly of said side frame.

13. In a car truck, the combination of a side frame, a spring plank, a bolster, a leaf spring supporting said bolster at a point and supported on said spring plank at a plurality of points, one of said points of support being outwardly of the side frame and the other of said points of support being through a coil spring disposed inwardly of said side frame.

14. In a car truck, the combination of a side frame, a spring plank, a bolster, a leaf spring supporting said bolster at a point substantially in the plane of said side frame and supported on said spring plank at a plurality of points, one of said points of support being outwardly of the side frame and the other of said points of support being through a coil spring disposed inwardly of said side frame.

15. In a car truck, the combination of a side frame, a spring plank, a coil spring carried by said spring plank inwardly of said side frame, a leaf spring supported at one end by said coil spring and at the other end directly by the spring plank, and a bolster supported by said leaf spring substantially in the plane of said side frame.

16. In a car truck, the combination of a side frame, a transverse member in engagement therewith, a load carrying member, means supporting said load carrying member on said transverse member, said means including a coil spring disposed inwardly of said side frame and on said transverse member and a load transmitting member supported on said transverse member and said coil spring and engaging said load carrying member.

17. A spring plank for car trucks, including a substantially box-shaped body portion, said portion having a spring pocket spaced from an end thereof for the reception of a coil spring, a leaf spring seat disposed adjacent the end of said body portion, and means on the bottom chord of said body portion between said pocket and seat for positioning said plank.

18. A spring plank for car trucks, including a substantially U-shaped body portion, said portion having a spring pocket spaced from an end thereof for the reception of a coil spring, a leaf spring seat disposed within said body portion adjacent the end of said body portion, and means on the bottom chord of said body portion between said pocket and seat for positioning said plank.

19. In a car truck, the combination of a spring plank, semi-elliptic springs mounted on the ends of the spring plank and each supported at spaced points and a spring disposed between said semi-elliptic springs and the spring plank at the inner of the spaced points of support, and a bolster supported by said springs.

20. In a car truck, the combination of a detachable spring plank, spaced semi-elliptic springs each supported thereon at spaced points, and a spring interposed between said springs and said spring plank at the inner of each of the points of support, and a bolster engaging each of said first named springs at a single point.

21. In a car truck, the combination of a side frame, a detachable spring plank, a coil spring carried by said spring plank inwardly of said side frame, a semi-elliptic leaf spring supported at one end by the coil spring and at the other end directly by said spring plank, and a bolster supported by said leaf spring.

22. In a car truck, the combination of a side frame and a spring plank, a semi-elliptic leaf spring supportd on said spring plank at spaced points, the inner of said points of support including a coil spring, lateral motion means carried by said leaf spring, and a bolster supported on said lateral motion means.

23. In a spring plank for car trucks, the combination of spaced pockets for coil springs, spaced seats for leaf springs disposed outwardly of said spaced pockets, and spaced means for connection to side frames.

24. In a spring plank for car trucks, the combination of spaced pockets for coil springs, spaced seats for leaf springs disposed outwardly of said spaced pockets, and spaced means for connection to side frames and said spaced means being disposed between adjacent pockets and seats.

25. In a car truck, the combination of spaced side frames including tension and compression members and integral connecting column guides each forming a window, a spring plank connecting said side frames, a bolster extending into said window, and a resilient load transmitting member supporting said bolster at a plurality of points adjacent said side frames, said points being on said spring plank inwardly and outwardly of said side frames, the inner of said points of support being resilient.

26. In a car truck, the combination of spaced side frames including tension and compression members and integral connecting column guides each forming a window, a spring plank connecting said side frames, a bolster extending into said window and a semi-elliptic spring supporting said bolster adjacent each end thereof, said semi-elliptic spring being supported on said spring plank inwardly and outwardly of said side frame, the inner of said points of support being resilient.

27. In a car truck, the combination of spaced side frames including tension and compression members and integral connecting column guides each forming a window, a spring plank connecting said side frames, a bolster extending into said window, a semi-elliptic spring supporting said bolster adjacent each end thereof, said semi-elliptic spring being supported on said spring plank, and a coil spring interposed between the inner end of said semi-elliptic spring and said spring plank.

28. In a car truck, the combination of spaced side frames including tension and compression members and integral connecting column guides each forming a window, a spring plank connecting said side frames, a bolster extending into said window, a semi-elliptic spring supporting said bolster adjacent each end thereof, said semi-elliptic spring being supported on said spring plank, and a coil spring interposed between the inner end of said semi-elliptic spring and said spring plank and said coil spring being of variable pitch.

29. In a car truck, the combination of spaced side frames including tension and compression members and integral connecting column guides each forming a window, a spring plank connecting said side frames, a bolster extending into said window, a semi-elliptic spring supporting said bolster adjacent each end thereof, said semi-elliptic spring being supported on said spring plank, and a coil spring interposed between the inner end of said semi-elliptic spring and said spring plank and said coil spring being of variable diameter.

30. In a car truck, the combination of spaced side frames including tension and compression members and integral connecting column guides each forming a window, a spring plank connecting said side frames, a bolster extending into said window, a semi-elliptic spring supporting said bolster adjacent each end thereof, said semi-elliptic spring being supported on said spring plank, and a coil spring interposed between the inner end of said semi-elliptic spring and said spring plank and said coil spring being of variable stiffness.

31. In a car truck, the combination of spaced side frames including tension and compression members and integral connecting column guides each forming a window, a spring plank connecting said side frames, a bolster extending into said window, a substantially rigid equalizer member supporting said bolster at a plurality of points on said spring plank, and a coil spring interposed between the inner end of said equalizer member and said spring plank, the outer end of said equalizer member being non-resiliently mounted on said spring plank.

32. In a car truck, the combination of a side frame and a spring plank, a semi-elliptic leaf spring supported on said spring plank at spaced points, the inner of said points of support including a coil spring, lateral motion means carried by said leaf spring, a bolster supported on said lateral motion means, and resilient pads disposed between said springs.

33. In a car truck, the combination of a side frame and a spring plank, a semi-elliptic leaf spring supported on said spring plank at spaced points, the inner of said points of support including a coil spring, lateral motion means carried by said leaf spring, a bolster supported on said lateral motion means, and resilient pads disposed between said springs and the associated truck parts.

34. In a car truck, the combination of a side frame and a spring plank, a semi-elliptic leaf spring supported on said spring plank at spaced points, the inner of said points of support including a coil spring, lateral motion means carried by said leaf spring, a bolster supported on said lateral motion means, and resilient pads disposed between one of said springs and the associated truck parts.

35. In a truck, the combination of a side frame, a member supported on said side frame, a load carrying member, and a movable member disposed between said load carrying member and said first named member and supported on said first named member at a plurality of points and above the same, and resilient means interposed between the inner of said points and said movable member.

36. In a car truck, the combination of a side frame, a member supported on said side frame, a load carrying member, and a movable member disposed between said load carrying member and first named member and supported on said first named member at a plurality of points and above the same, and resilient means interposed between the inner of said points and said movable member, said movable member supporting said load carrying member at a single point.

37. In a car truck, the combination of a side frame, a member supported on said side frame, a load carrying member, and a movable member disposed between said load carrying member and first named member and supported on said first named member at a plurality of points and above the same, and resilient means interposed between the inner of said points and said movable member, said movable member supporting said load carrying member at a single point and disposed between said plurality of points.

38. In a truck, the combination of a side frame, a member supported on said side frame, a load carrying member, and a movable member disposed between said load carrying member and first named member and supported on said first named member at a plurality of points and above the same, one of said points being inwardly of said side frame and the other of said points being outwardly of said side frame and resilient means interposed between the inner of said points and said movable member.

39. In a truck, the combination of a side frame, a member supported on said side frame, a load carrying member, and a movable member disposed between said load carrying member and first named member and supported on said first named member at a plurality of points and above the same, one of said points being inwardly of said side frame and the other of said points being outwardly of said side frame and resilient means interposed between the inner of said points and said movable member, said movable member supporting said load carrying member at a single point.

40. In a truck, the combination of a side frame, a member supported on said side frame, a load carrying member, and a movable member disposed between said load carrying member and first named member and supported on said first named member at a plurality of points and above the same, one of said points being inwardly of said side frame and the other of said points being outwardly of said side frame and resilient means interposed between the inner of said points and said movable member, said movable member supporting said load carrying member at a single point and disposed between said plurality of points.

41. In a truck, the combination of a side frame, a member supported on said side frame, a load carrying member, and a movable member disposed between said load carrying member and first named member and supported on said first named member at a plurality of points and above the same, one of said points being inwardly of said side frame and the other of said points being outwardly of said side frame and resilient means interposed between the inner of said points and said movable member, said movable member supporting said load carrying member at a single point and disposed between said plurality of points and substantially in the plane of said side frame.

42. A spring plank for car trucks including a substantially box section body portion, said portion having a spring pocket disposed inwardly of the ends thereof for the reception of a coil spring, a leaf spring pocket disposed adjacent the ends of said body portion and outwardly of said spring pocket and means on the bottom chord of said body portion between said pocket and seat for positioning said plank.

43. A spring plank for car trucks including a substantially U-sectioned body portion, said portion having a spring pocket inwardly of an end thereof for the reception of a coil spring, a leaf spring pocket disposed within said body portion adjacent an end thereof and outwardly of said pocket, and means on the bottom chord of said body portion between said pocket and seat for positioning said plank.

44. A spring plank for car trucks including a substantially U-sectioned body portion, said portion having a spring pocket inwardly of an end thereof for the reception of a coil spring, a leaf spring pocket disposed within said body portion adjacent an end thereof and outwardly of said pocket, and means for positioning said plank.

45. A spring plank for car trucks, including a body portion, said portion having a spring pocket within said body portion and inwardly of the ends thereof, a seat adjacent said pocket and outwardly thereof, and means between said pocket and seat for positioning said plank.

46. In a car truck, the combination of a side frame and a spring plank, a semi-elliptic leaf spring supported on said spring plank at spaced points, the inner of said points of support including a coil spring, lateral motion means carried by said leaf spring, and a bolster supported on said lateral motion means.

47. In a truck, the combination of a side frame, a member supported on said side frame, a load carrying member, and a movable member disposed between said load carrying member and first named member and supported on said first named member at a plurality of points and above the same, and resilient means interposed between the inner of the points of support of said movable member and said first named member, said load carrying member being mounted on lateral motion means carried by said movable member.

48. In a truck, the combination of a side frame, a member supported on said side frame, a load carrying member, and a movable member disposed between said load carrying member and first named member and resiliently supported on the first named member at a plurality of points above the same, and resilient means interposed between the inner of said points and said movable member.

49. In a truck, the combination of a side frame, a member supported on said side frame, a load carrying member, and a movable member disposed between said load carrying member and first named member and resiliently supported on the first named member at a plurality of points above the same, and resilient means interposed between the inner of said points and said movable member the outer of said points of support being non-resilient.

Signed at Chicago, Illinois, this 22nd day of September, 1931.

WILLIAM C. HEDGCOCK.